March 9, 1965   R. W. LOVE   3,172,589
GLASS TUBE SEVERING APPARATUS
Filed Aug. 20, 1962   3 Sheets-Sheet 1

Inventor:
Robert W. Love
by Otto Tichy
His Attorney

March 9, 1965  R. W. LOVE  3,172,589
GLASS TUBE SEVERING APPARATUS
Filed Aug. 20, 1962  3 Sheets-Sheet 3
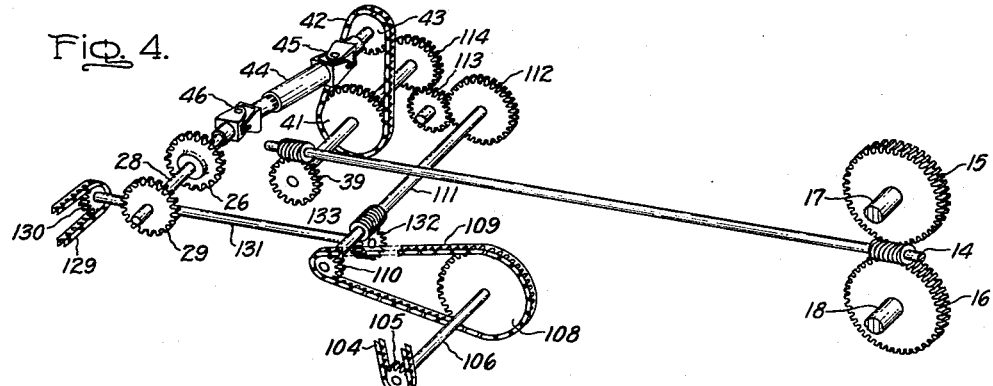
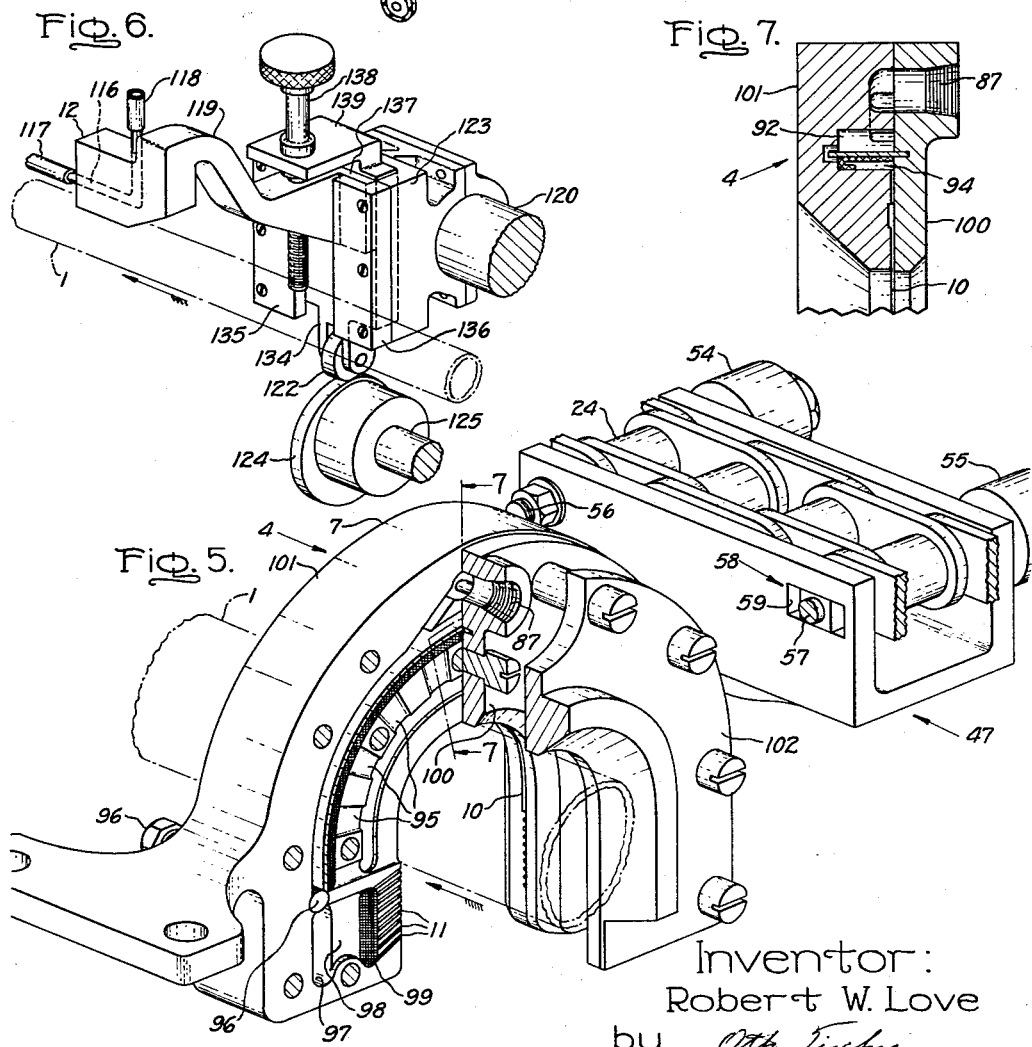
Inventor:
Robert W. Love
by Oth Tichy
His Attorney

United States Patent Office 3,172,589
Patented Mar. 9, 1965

3,172,589
GLASS TUBE SEVERING APPARATUS
Robert W. Love, Cleveland Heights, Ohio, assignor to General Electric Company, a corporation of New York
Filed Aug. 20, 1962, Ser. No. 217,994
7 Claims. (Cl. 225—93.5)

The present invention relates to glass tube severing apparatus and more particularly to apparatus for receiving and severing glass tubing as it is drawn continuously at a high rate of speed from a glass tube forming machine of the type shown in Patent 1,218,598, granted March 6, 1917, to Danner.

The speed at which Danner type tube drawing machines can be operated depends upon the speed with which the continuously drawn tubing can be severed into lengths suitable for handling, shipment and use. Various types of apparatus have been suggested heretofore for severing continuously drawn tubing into lengths of desired sizes but many are suitable for severing only such tubing of small outer diameter, such as about one-quarter inch, and others intended for severing tubing of an outer diameter of about one to two inches are capable of successful operation only at speeds substantially less than the speed at which the tube forming machine is capable of operating. Lengths of glass tubing of various sizes having an outer diameter of about three-fourths to about one and one-half inches are used extensively in making, for example, the tubular glass envelopes of fluorescent electric discharge lamps having an overall length of about 15 to 96 inches. A commercial 40 watt fluorescent discharge lamp produced in large numbers has an overall length of 48 inches and a tubular glass envelope having an outer diameter of one and one-half inches.

The principal object of the present invention is to provide apparatus for severing continuously drawn glass tubing into lengths of predetermined size, said apparatus being capable of high speed operation to improve the efficiency of the tube forming and severing operation. Another object of the invention is to provide such an apparatus particularly suitable for severing continuously drawn glass tubing for use in fluorescent lamp envelopes. Further objects and advantages of apparatus embodying the invention will appear from the accompayning drawings and description of a species thereof.

A feature of the apparatus embodying the invention is a means for heating continuously drawn glass tubing in a narrow circumferential zone extending completely around the tubing, means for thereafter imparting a thermal shock to the glass in the hot zone to cause the glass in the zone to fracture cleanly and means to carry the heating means continuously in a closed path extending, at least in part, parallel with the path of travel of the continuously drawn tubing. The apparatus is constructed and arranged in such manner that the heating means is supported in effective heating relation with respect to the tubing and travels in the same direction at the same speed as the drawn tubing so that a selected narrow annular portion of the tubing is heated for a time sufficient to raise its temperature substantially above the temperature of the remainder of the tubing. Thus, on being subjected to a thermal shock caused by contact with the cooling means located beyond the heating means in the direction of travel of the drawn tubing the tubing is cleanly and effectively fractured within the hotter narrow portion extending completely around the tubing.

The occurrence of longitudinally extending cracks or notches or the like at the ends of the severed lengths of the tubing is minimized by the apparatus of the invention and the tubing is accurately severed in lengths of desired size at high speed. Defects of this kind and off-size lengths of tubing have been encountered heretofore when attempts have been made to operate other types of severing apparatus at high speed. For example, in the high speed operation of apparatus in which the heating means is carried back and forth along the tubing the linear reciprocating motion of the heating means inherently results in imprecise heating of the drawn tubing and a heating time insufficient to effectively raise the temperature of the glass in the zone selected for fracture.

By utilizing means to carry the heating means continuously in a closed path in accordance with the present invention a plurality of burners may be carried along an extended path parallel with the path of travel of the drawn tubing to precisely control the heating of the tubing in narrow annular zones for a sufficient time to cause fracture thereof in the heated zones on contact of the zones with the cooling means.

In the accompanying drawings,

FIG. 4 is a diagrammatic showing of the drive mechanism of the tractor and the severing apparatus.

FIG. 5 is a perspective view of an air-gas burner on the apparatus with a part of the burner broken away to show the internal structure thereof and a similar view of a carrier chain for the burner.

FIG. 6 is a perspective view of the chilling means for the drawn tubing, and

FIG. 7 is a fragmentary sectional view of the burner shown in FIG. 5 and taken along the line 7—7 of FIG. 5 in the direction of the arrows.

General description

Figure 1:
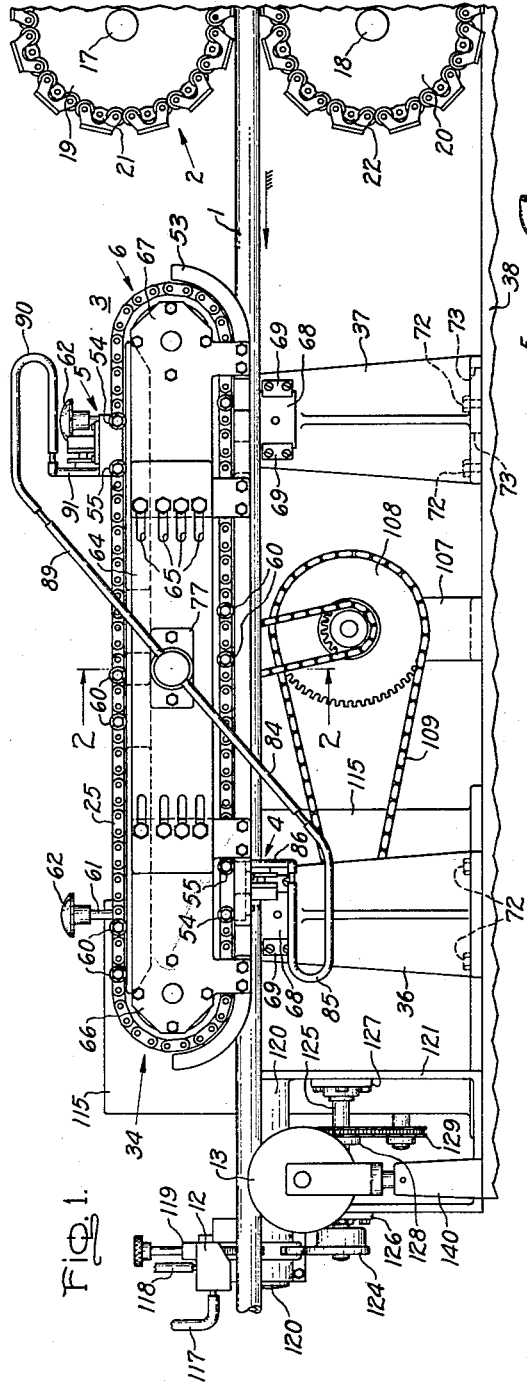
FIG. 1 is a side elevational view of a severing apparatus embodying the invention, the tube drawing tractor for feeding the continuously drawn tubing to the severing apparatus being shown in a similar fragmentary view.
Figure 2:
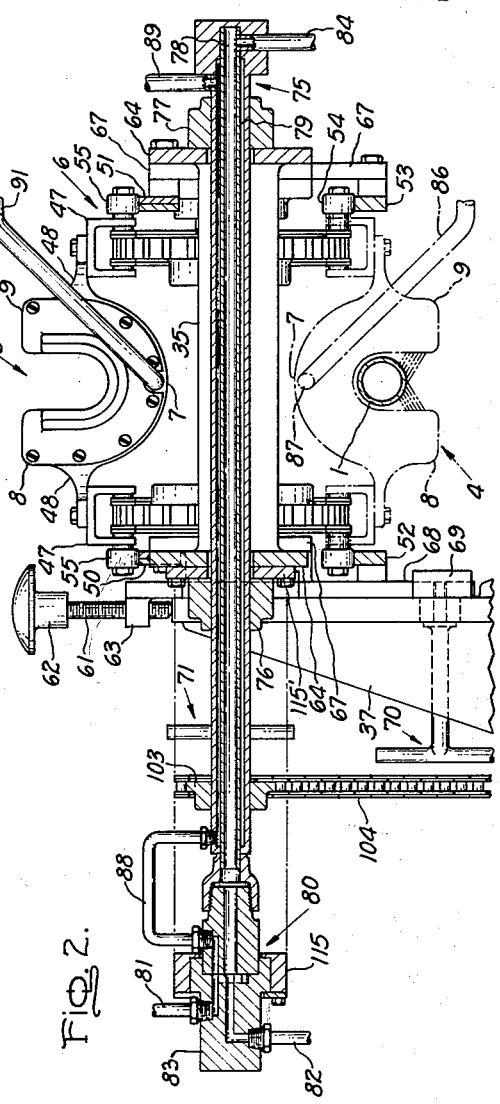
FIG. 2 is a sectional elevational view on an enlarged scale taken along the line 2—2 of FIG. 1 in the direction of the arrows.
Figure 3:
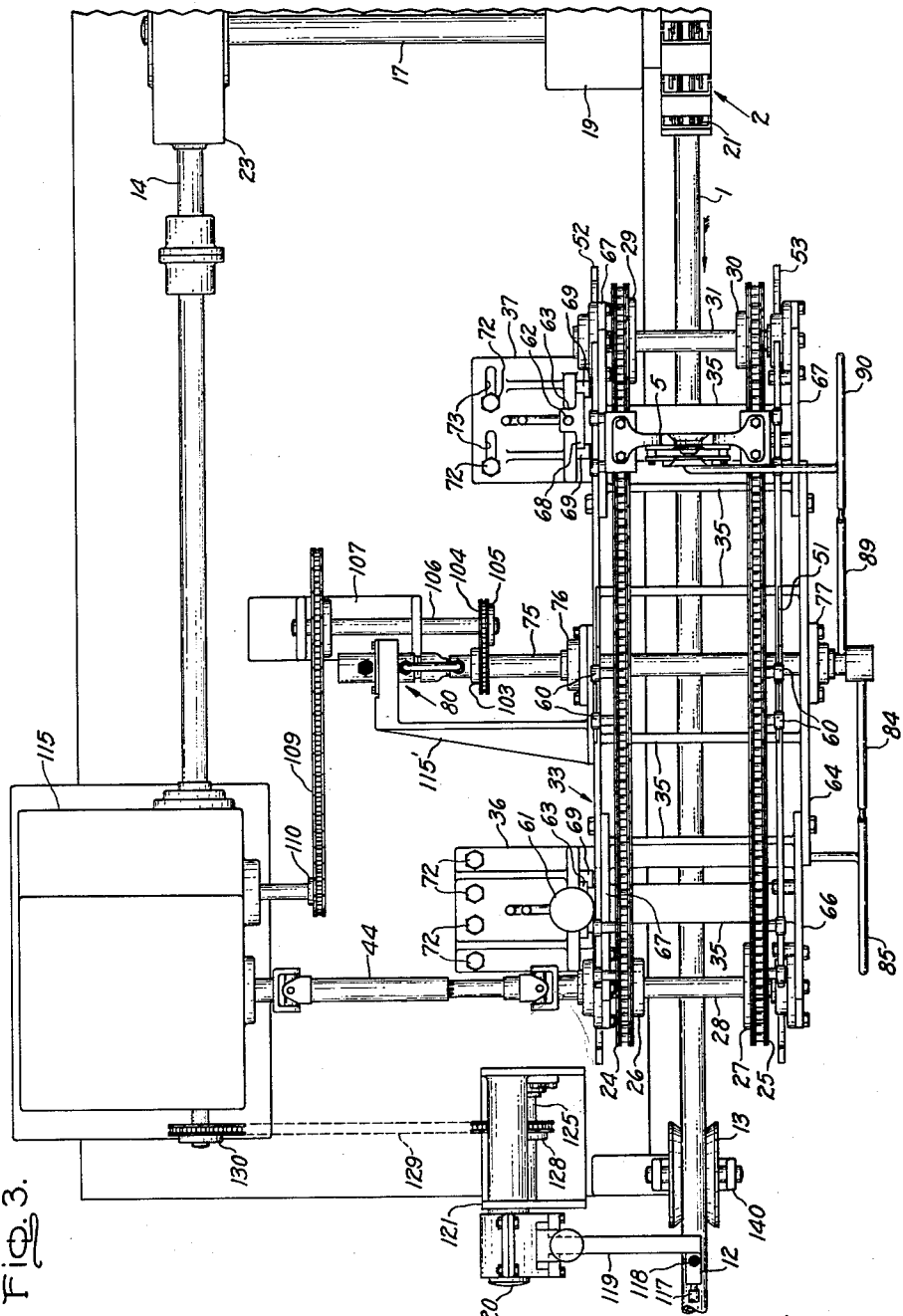
FIG. 3 is a top plan view of the apparatus shown in FIG. 1 and on the same scale as FIG. 1.

In the embodiment of the invention shown in FIGS. 1, 2 and 3, the drawn tubing 1 fed longitudinally along a linear path by the tractor 2 to the severing apparatus 3 extends through and is heated in a narrow circumferential zone by one of the two identical horseshoe-shaped gas burners 4 and 5 which are carried in sequence in the direction of travel of the tubing 1 and at the same speed as the tubing by the endless chain carrier means or conveyor 6 mounted above the linear path of travel of the tubing as described hereinafter.

As shown in FIG. 2 of the drawings each of the burners 4 and 5 is in the form of an open loop with the open part thereof facing outwardly of the conveyor 6. Each of the burners straddles the tubing as the burner is carried along the lower run or reach of the endless conveyor 6. The arcuate bight portion 7 of the burner then is above the tubing 1 as shown in phantom in FIG. 2 and in full in FIG. 5 and the straight parallel legs or arms 8 and 9 of the burner extend downwardly beyond the tubing as best shown in FIG. 2. The burners 4 and 5 are each provided with a narrow gas discharge slot 10 (FIG. 5) directed inwardly of the bight 7 for directing an extremely narrow sheet of flame against the top portion of the tubing as the burner travels along the lower reach of the carrier means 6. The leg portions 8 and 9 of the burners are provided with a series of jets 11 slanted toward the bight 7 for directing flames toward the lower portion of the tubing, as indicated in phantom in FIG. 2. The burners 4 and 5, as these are carried along the lower reach of the carrier means 6, are so positioned with respect to the longitudinal axis of the tubing 1 that the center of curvature of the bight 7 of the burner defining the slot 10 coincides with the longitudinal axis of the drawn tubing 1 as the tubing travels longitudinally along the linear path.

The combined heating effect of the narrow sheet flame directed against the top portion of the tubing and the narrow or fine jet flames directed against the lower portion of the tubing results in a narrow circumferential zone extending around the entire circumference of the tubing being heated sufficiently to cause the tubing to crack cleanly in the heated zone when the latter is engaged by the chill block member 12 which imparts the required thermal shock to the tubing to cause the latter to crack at the heated zone.

The open loop shape of the burners 4 and 5 makes possible the mounting thereof on the continuously driven endless chain type conveyor 6. This arrangement makes it possible to draw and sever the tubing at high speeds because no time is lost in bringing the burners into heating relation to the zone of the tubing to be fractured. Further, great accuracy in the lengths of tubing severed from the drawn tubing and clean breaking of the tubing is obtained even at the high speeds of operation characteristic of severing apparatus embodying the present invention due to the accurate location of the burners with respect to the zones of the tubing to be heated.

*Operation and detailed structure*

As the tubing 1 is fed at a uniform rate in the direction of the arrow to the severing apparatus 3 by the drawing tractor 2 (FIGS. 1 and 3) it first passes beneath the conveyor 6 and over the guide roll 13 before being engaged by the chill block 12. The tubing is rotated on its longitudinal axis by the drawing tractor 2 as is known in the art. The tractor 2 is driven through drive shaft 14 (FIG. 4) connected to a drive motor (not shown) and worm gears 15 and 16. The shafts 17 and 18 of the worm gears 15 and 16, respectively, are keyed to the sprockets 19 and 20 (FIG. 1) engaging the chain belts 21 and 22 of the drawing tractor 2. The gears 15 and 16 are located in housing 23 shown in FIG. 3.

The conveyor 6 for the burners 4 and 5 include a pair of parallel mounted endless chain belts 24 and 25 carrying burners 4 and 5 and engaging a pair of sprockets 26 and 27 affixed to shaft 28 and a pair of sprockets 29 and 30 affixed to the shaft 31 (FIGS. 1 and 3). The shafts 28 and 31 are journalled to the rigid frame 32 of the conveyor 6 which frame is made up of a pair of laterally spaced apart elongated segmented side plate assemblies 33 and 34 fastened to each other by bridging bars 35. The frame 32 is mounted on a pair of supporting standards 36 and 37 attached to the base 38 as described below. The chains 24 and 25 of the conveyor 6 are driven as shown in FIG. 4 by the shaft 14 of the tractor drive through gear 39, shaft 40, sprocket 41, chain 42, sprocket 43, shaft 44 having universal joints 45 and 46 and shaft 28 to which the chain engaging sprockets 26 and 27 are affixed. The ratio of the various parts of the drive mechanism to each other is such that the lower reach or flight of the chains 24 and 25 travel at the same speed and in the same direction as the tubing 1 fed by the tractor 2.

The burners 4 and 5 are connected to each of the chains 24 and 25 by carriages 47 provided at points directly opposite each other laterally and longitudinally of the chains as shown in FIGS. 1 and 2. This balances the conveyor and effects heating of the tubing 1 by the burners at parts of the tubing equally spaced apart in a longitudinal direction. Each of the burners 4 and 5 has outwardly extending bracket arms 48 each of which is bolted to a carriage 47 to form a stiff yoke across the chains 24 and 25.

The carriages 47 and therewith the burners 4 and 5 are supported and accurately guided by two pairs of tracks 50, 51 and 52, 53 bolted to the frame 32 and engaged by rollers 54 and 55 on the carriages 47 as shown in FIGS. 1, 2 and 3. The lower pair of tracks 52 and 53 are curved at their ends and extend part way around the sprockets for the chains, as shown in FIGS. 1 and 3. The rollers 54 and 55 of the carriages 47 are mounted on the ends of pins 56 and 57, respectively (FIG. 5), which extend through the chain and the sides of the carriages on opposite sides of the chain to connect the carriages to the chains. The pin 57 at the rear end of each of the carriages is mounted on slides which engage longitudinally extending slots in the sides of the carriages. One of the slides is shown at 58 in FIG. 4, engaging the sides of a slot 59. This structure allows the chains to engage the sprockets smoothly. Additional rollers 60 are provided at spaced points along the chains (FIGS. 1 and 3) for smooth running of the chains.

The frame 32 is mounted for adjustments vertically on the support posts 36 and 37 so that the burners 4 and 5 may be positioned accurately with respect to the tubing 1 for effective heating of the tubing as described above and to adopt the apparatus for severing tubing of different outer diameter. For this purpose adjustment screws 61 and 62 bear against the top of the supports 36 and 37 and are in threaded engagement with lugs 63 (FIG. 2) provided adjacent the ends of the segmented plate 33 of the frame 32. As shown in FIGS. 1, 2 and 3 the plate assemblies 33 and 34 of the frame 32 are each made up of an elongated center section 64 provided with a series of longitudinally extending slots 65 adjacent each end and two end sections 66 and 67 fastened to the center section by bolts extending through the slots 65. The length of the frame 32 thus may be changed as described below to change the size of the lengths of tubing severed by the apparatus.

The lugs 63 are integral with slides 68 affixed to the end sections 66 and 67 of the plate assembly 33 and the slides are movable in vertical ways formed by gibs 69 on the support standards 36 and 37 (FIGS. 2 and 3). When the frame 32 has been brought into proper position vertically with respect to the tubing 1 by the adjustment screws 61 and 62 it is held in immovably on the standards 36 and 37 by clamps 70 and 71 (FIG. 2) which pass through vertical slots in the standards 36 and 37 and screw into thread holes near the top and bottom of the slides 68.

The length of the frame 32 may be adjusted as mentioned above by loosening the bolts holding the sections of the plate assemblies 33 and 34 together and moving the standard 37 toward the standard 36 by loosening the bolts 72 passing through the slots 73 in the bottom of standard 37 and engaging a series of threaded holes in the base 38. The standard 37 may then be moved toward standard 36 to shorten the frame. The chains 24 and 25 may be shortened by removing links therefrom or may be replaced by shorter chains. Additional burners may be mounted on the conveyor to sever shorter lengths from the tubing 1.

The tracks 50 and 53 are bolted to the end sections 66 and 67 of the plate assemblies 33 and 34 and each are made in two longitudinally extending parts which are overlapping in the region of the center sections 64 of the plate assemblies 33 and 34 as shown in FIG. 1 to allow shortening of the frame 32 when the various parts of the apparatus are in the relative positions shown in FIGS. 1, 2 and 3.

The required combustible air-gas mixture is supplied to each of the burners 4 and 5 through the rotatable spindle 75 journalled at 76 and 77 to the center sections 64 of the plate assemblies 33 and 34, respectively. The spindle 75 provides a central passage 78 and an annular passage 79 for conducting the air-gas mixture from the rotary gas coupler 80 of conventional structure having conduits 81 and 82 connected to the stationary part 83 thereof. The conduits 81 and 82 are connected to the gas and air valves (not shown) for each of the burners 4 and 5. The air-gas mixture for the burner 4 flows through the conduit 82, the coupler 80, the central passage 78, the metal pipe 84 secured at one end to the outer end of spindle 75 and communicating with passage 78 as shown in FIG. 2, the flexible pipe 85 of soft rubber, for example, coupled to the pipe 84 and a metal pipe 86 secured to the burner 4 by its end screwed into the threaded opening 87 of the burner 4.

The combustible air-gas mixture is supplied to the burner 5 through the conduit 81, the coupler 80, the U-shaped conduit 88, the annular passage 79, the metal pipe 89, the flexible pipe 90 and the metal pipe 91 secured to the burner 5. As shown in FIGS. 5 and 7 the air-gas mixture thus conducted to the burners is introduced into the burner manifold 92 from the opening 87, passes around the plate 93, through the screen 94 and thence through the series of slots 95 and the narrow slot 10 for combustion in the form of a narrow sheet of flame directed against the tubing 1. The jets 11 are supplied with the air-gas mixture flowing from the manifold 92 through the regulating valve 96 to the passages 97 and 98 and thence through the screen 99 to the jets 11. The front plate 100 of the burner is bolted to the body 101 thereof and a protection plate 102 is bolted to the face plate as shown in FIG. 5.

The spindle 75 is rotated at a rate synchronized with the speed of the burners 4 and 5 by the sprocket 103 affixed to the spindle, the chain 104, the sprocket 105 on the shaft 106 journalled to the standard 107 bolted to the base 38, the sprocket 108 on the shaft 106, the chain 109, the sprocket 110, affixed to the shaft 111, and the train of gears 112, 113 and 114 contained in housing 115. Gear 114 is affixed to shaft 40 which is driven by main drive shaft 14 as described above. The stationary part 83 of the rotary gas coupler 80 is secured to the bracket 115' bolted to the center section 64 of the plate assembly 33 as shown in FIGS. 2 and 3.

The chill block 12 (FIGS. 1, 3 and 6) for causing fracture of the tubing 1 at the narrow annular zones of the latter heated by the burners 4 and 5 is a metal block having a passage 116 therethrough for the circulation of coolant supplied from a source (not shown) through the flexible hoses 117 and 118. The lower surface of the block 12 is curved slightly to provide a substantial area for engaging the tubing 1.

The block 12 is mounted at the free end of arm 119 which has flanges 137 which ride with slide 134 in a guideway formed by gibs 135 and 136 and bracket 123 which is clamped to bar 120 affixed to the support standard 121 bolted to the base 38 of the apparatus. The arm 119 is movable vertically with slide 134 with respect to the tubing to carry the block 12 into a lowered position in which it engages the tubing 1 and a raised position in which it is out of engagement with the tubing. The actuating means for the arm 119 includes a cam follower 122, a slide 134, a cam 124 mounted on cam shaft 125 journalled at 126 and 127 to standard 121 (FIG. 1), a sprocket 128 affixed to shaft 125, the chain 129 engaging sprocket 130 (FIG. 4) on one end of shaft 131, gear 132 on the opposite end of shaft 131 and gear 133 on shaft 111 which is driven by main drive shaft 14, as described above.

The actuating means for the chill block 12 is in such relation to the drive for the tractor 2, the carrier means for the burners 4 and 5 and the spindle 75 of the gas supply means that the block 12 is in its lowered position as each portion of tubing 1 heated by the burners 4 and 5 travels beneath the chill block and is in its raised position when the unheated parts of the tubing between the burner heated zones are beneath the block.

In order to adjust the position of the chill block to engage drawn tubing 1 of different diameters to be severed by the apparatus a height adjustment is provided between the arm 119 and the slide 134 which carries the cam follower 122. The adjustment screw 138 engages a threaded hole in the arm 119 through a bracket 139 on the upper end of slide 134 to change the relative positions of the chill block 12 and the cam follower 122, when desired.

The guide roller 13 of the apparatus is mounted on an adjustable standard 140 attached to the base 38 and is rotated by the drawn tubing 1 as the latter travels toward the location of the chill block 12. Rollers of various diameters may be used according to the outer diameter of the drawn tubing to be severed into lengths by the apparatus.

While the best mode of carrying out the invention has been disclosed herein in accordance with the requirements of the statutes, it is contemplated that changes in the form and details of the apparatus may be made by those skilled in the art without departing from the scope of the invention as defined in the appended claims, for example, when various lengths or larger diameters of tubing are to be severed by the apparatus the support frame 32 may be lengthened by incorporating additional sections in the segmented plate assemblies 33 and 34 and by utilizing endless chain belts of a size corresponding to the increased length of the frame 32, by selecting the number of burners or internal size of burners according to the size of the lengths or diameters of tubing desired and by changing the speed of rotation of the gas supply means and the speed of operation of the chill block member in accordance with the changes made in the conveyor.

What I claim as new and desire to secure by Letters Patent of the United States is:

1. In apparatus for severing lengths from an elongated vitreous tube travelling longitudinally at a uniform rate in a linear path, the combination comprising:
   (a) an endless chain belt conveyor mounted with a reach thereof adjacent and extending parallel with the said linear path,
   (b) a support for said conveyor,
   (c) means for driving the conveyor continuously at a speed and in a direction such that the said reach of the conveyor travels in the same direction and at the same speed as the tube in said path,
   (d) an open loop-shaped burner having gas discharge orifices inwardly directed of the loop,
   (e) the burner being affixed to and opening outwardly of the conveyor to travel continuously with the conveyor and to straddle and locally heat the tube in said path.

2. The combination according to claim 1 wherein the bight of the burner is a semi-circular arc and the legs of the burner are straight and parallel to each other in the plane of the bight.

3. The combination according to claim 2 wherein the burner has a narrow slot orifice coextensive with the bight and fine jet orifices arranged in a series along each leg with the jets in each series roughly parallel to each other and sloping generally inwardly of the burner toward points progressively lower than the center of curvature of the bight whereby with the center of curvature of the bight coincident with the longitudinal axis of a tube travelling in the linear path the burner heats the tube in a narrow circumferential zone extending completely around the tube.

4. The combination according to claim 3 wherein adjustment means is provided for changing the position of the conveyor on the support to bring the center of curvature of the bight of the burner into coincidence with the longitudinal axis of tubes of various diameters travelling in said path.

5. The combination according to claim 1 wherein the endless belt conveyor includes a segmented support frame expansible along the said linear path.

6. The combination according to claim 5 wherein air-gas supply means for the burner is mounted for rotation on the support frame and means connected to the drive means for said conveyor is provided for rotating the gas supply means at a speed whereat the gas supply means is rotated one complete turn for each complete circuit of the burner.

7. The combination according to claim 1 which includes a chill member mounted beyond the conveyor in the direction of travel of the tube for engaging and imparting a thermal shock to the locally heated area of the tube to effect severance of the tube.

References Cited by the Examiner
UNITED STATES PATENTS

| | | | |
|---|---|---|---|
| 2,310,469 | 2/43 | Snyder | 225—93.5 |
| 2,410,931 | 11/46 | Eisler | 225—93.5 |
| 2,521,352 | 9/50 | Dockerty et al. | 225—93.5 |

FOREIGN PATENTS 843,193  8/60  Great Britain.

References Cited by the Applicant
UNITED STATES PATENTS 1,218,598  3/17  Danner.

WILLIAM W. DYER, Jr., *Primary Examiner.*